United States Patent
Chiu et al.

(10) Patent No.: US 9,857,670 B2
(45) Date of Patent: Jan. 2, 2018

(54) POWER BOARD AND BALLAST MODULE AND PROJECTOR USING THE SAME

(71) Applicants: Qisda Optronics (Suzhou) Co., Ltd., Suzhou, Jiangsu (CN); Qisda Corporation, Taoyuan (TW)

(72) Inventors: Hsien-Tsung Chiu, Taoyuan (TW); Fang-Chieh Lu, New Taipei (TW); Ying-Fang Lin, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 3 days.

(21) Appl. No.: 15/054,109

(22) Filed: Feb. 25, 2016

(65) Prior Publication Data

US 2016/0262281 A1 Sep. 8, 2016

(30) Foreign Application Priority Data

Mar. 6, 2015 (TW) .............................. 104107215 A (51) Int. Cl.
*G03B 21/14* (2006.01)
*G03B 21/00* (2006.01)

(52) U.S. Cl.
CPC .......... *G03B 21/145* (2013.01); *G03B 21/00* (2013.01); *G03B 21/14* (2013.01)

(58) Field of Classification Search
CPC ....... G03B 21/145; G03B 21/14; G03B 21/00
See application file for complete search history.

(56) References Cited

U.S. PATENT DOCUMENTS

| 5,908,235 A * | 6/1999 | Petrozello | H05B 41/02 362/219 |
| 2006/0232982 A1* | 10/2006 | Tsai | G03B 21/145 362/371 |
| 2007/0242232 A1* | 10/2007 | Shih | G03B 21/16 353/61 |

FOREIGN PATENT DOCUMENTS

TW M401190 4/2011

* cited by examiner

*Primary Examiner* — Sultan Chowdhury
*Assistant Examiner* — Magda Cruz (57) ABSTRACT

A power board and ballast module includes a housing, a power board, a ballast and an electrical connector. The power board is disposed in the housing. The ballast is disposed in the housing and electrically connected to the power board. The electrical connector is disposed in the housing and exposed out of the housing, wherein the power board and the ballast are electrically connected to the electrical connector respectively. Projectors using the power board and ballast module are also provided.

15 Claims, 9 Drawing Sheets

FIG. 9 though # US 9,857,670 B2

POWER BOARD AND BALLAST MODULE AND PROJECTOR USING THE SAME

BACKGROUND OF THE INVENTION

1. Field of the Invention

The present invention relates to a power board and ballast module and projectors using the same, and more particularly, to a power board and ballast module and projectors with improved assembly and disassembly efficiency.

2. Description of the Prior Art

Figure 1:
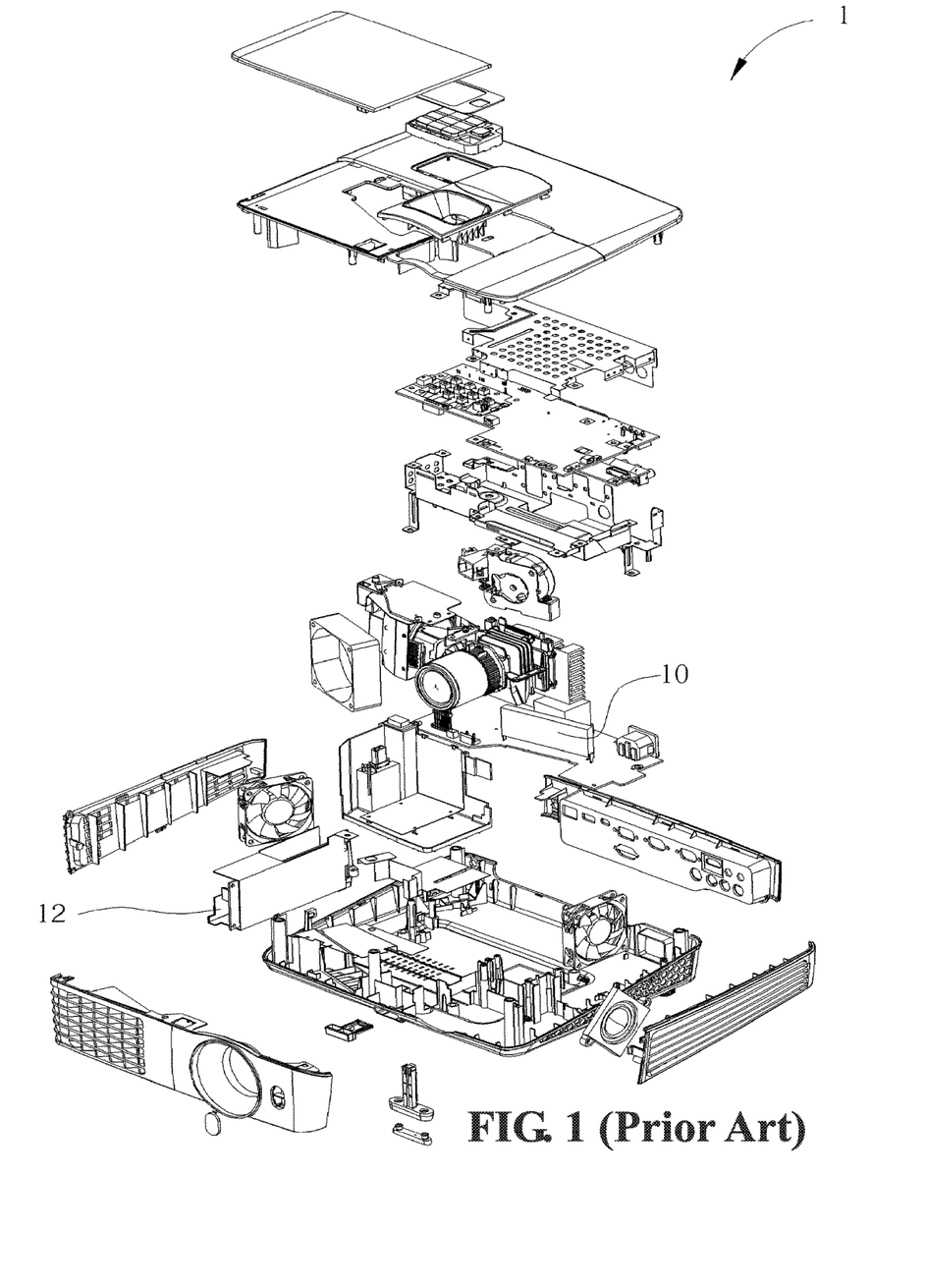
FIG. 1 is an exploded view of a projector according to the prior art.

In recent years, application of projectors has become increasingly extensive. Due to their audio and video functions, projectors have been used in meeting presentations in offices and many academic discussions and courses. Please refer to FIG. 1. FIG. 1 is an exploded view of a projector 1 according to the prior art. As shown in FIG. 1, the projector 1 according to the prior art is comprised of many components. Generally speaking, all the components of the projector 1 are assembled by stacking. When one of the components needs to be replaced, such as the power board 10 or the ballast 12, all of the components have to be disassembled one by one, which is highly inefficient. As disassembly and assembly of the projector 1 are time-consuming and difficult, it would be troubling to a user if the power board 10 or the ballast 12 of the projector 1 is damaged and needs to be replaced during a meeting.

SUMMARY OF THE INVENTION

One of the purposes of the present invention is to provide a power board and ballast module and projectors with improved assembly and disassembly efficiency to solve the aforementioned problems.

According to one embodiment of the present invention, the power board and ballast module comprises a housing, a power board, a ballast and an electrical connector. The power board is disposed in the housing. The ballast is disposed in the housing and electrically connected to the power board. The electrical connector is disposed in the housing and exposed out of the housing, wherein the power board and the ballast are electrically connected to the electrical connector, respectively.

According to another embodiment of the present invention, the projector comprises a casing, an opto-mechanical module, a first electrical connector and a power board and ballast module. The casing comprises a containing tank. The opto-mechanical module is disposed in the casing. The first electrical connector is disposed in the containing tank. The opto-mechanical module is electrically connected to the first electrical connector. The power board and ballast module comprises a housing, a power board, a ballast and a second electrical connector. The housing is detachably disposed in the containing tank. The power board is disposed in the housing. The ballast is disposed in the housing and electrically connected to the power board. The second electrical connector is disposed in the housing and exposed out of the housing. The power board and the ballast are electrically connected to the second electrical connector respectively. When the housing is disposed in the containing tank, the first electrical connector and the second electrical connector are electrically connected to each other.

According to yet another embodiment of the present invention, the projector comprises a casing, an opto-mechanical module, a first electrical connector and an electronic module. The casing comprises a containing tank. The opto-mechanical module is disposed in the casing. The first electrical connector is disposed in the containing tank. The opto-mechanical module is electrically connected to the first electrical connector. The electronic module comprises a housing, a plurality of electronic components and a second electrical connector. The housing is detachably disposed in the containing tank. The plurality of electronic components are disposed in the housing. The second electrical connector is disposed in the housing and exposed out of the housing. The plurality of electronic components are electrically connected to the second electrical connector individually. When the housing is disposed in the containing tank, the first electrical connector and the second electrical connector are electrically connected to each other.

In sum, according the present invention the power board and the ballast of the projectors are modulated into the power board and ballast module, and a containing tank is formed on the casing of the projector to contain the power board and ballast module. When the power board and/or the ballast are/is damaged, the user is able to easily disassemble the power board and ballast module from the containing tank so that the damaged power board and/or the ballast can be replaced quickly. After replacement, the user may simply dispose the power board and ballast module in the containing tank to allow the electrical connector of the power board and ballast module to electrically connect to the electrical connector in the containing tank, and the projector would operate normally right away. Thus the present invention improves the assembly and disassembly efficiency of the power board and/or the ballast. Please note that in addition to the power board and the ballast being modulated into the power board and ballast module, other electronic components can also be selectively modulated into an electronic module so as to improve the assembly and disassembly efficiency.

The above and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 2:
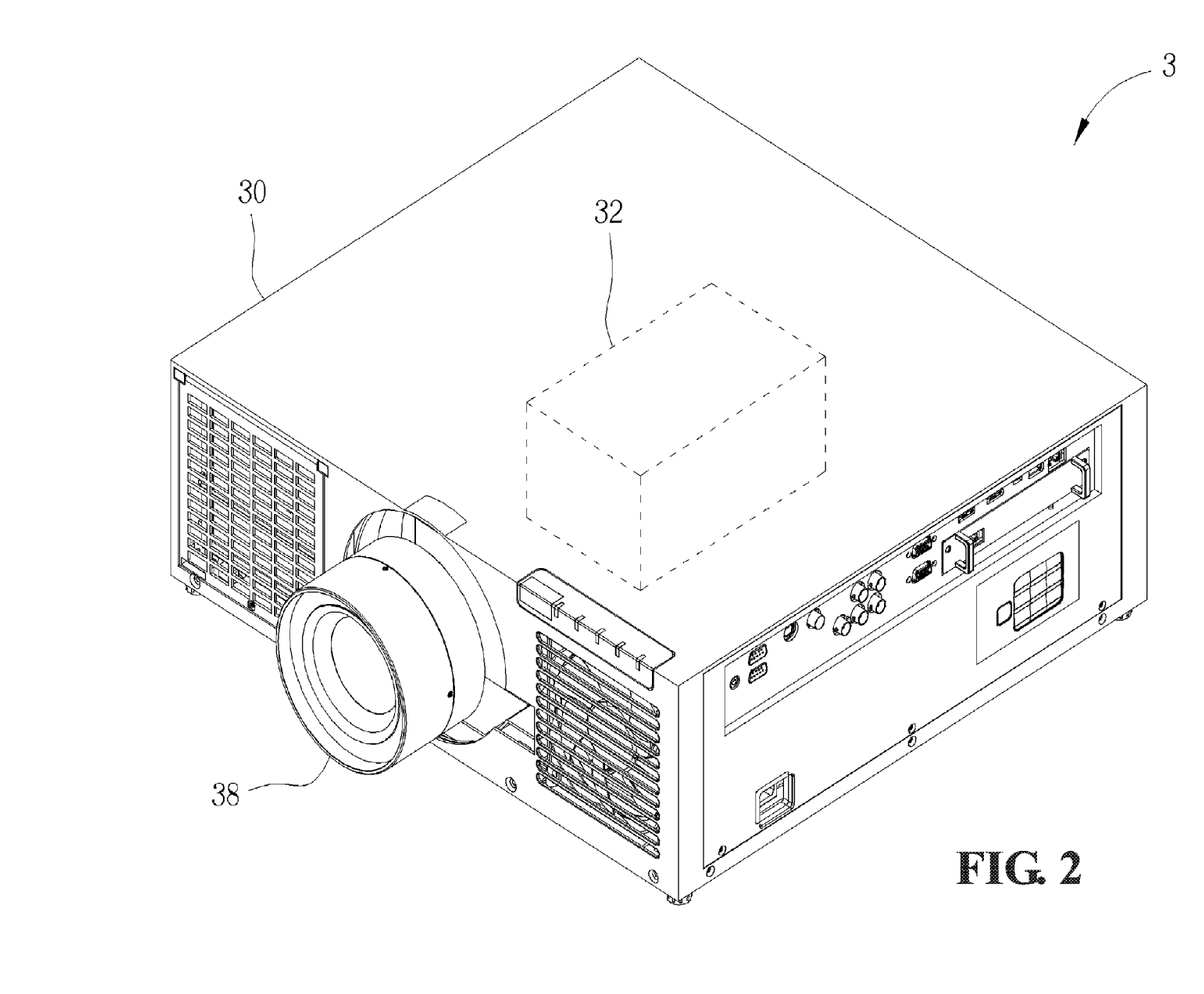
FIG. 2 is a three dimensional view of a projector according to an embodiment of the present invention.
Figure 3:
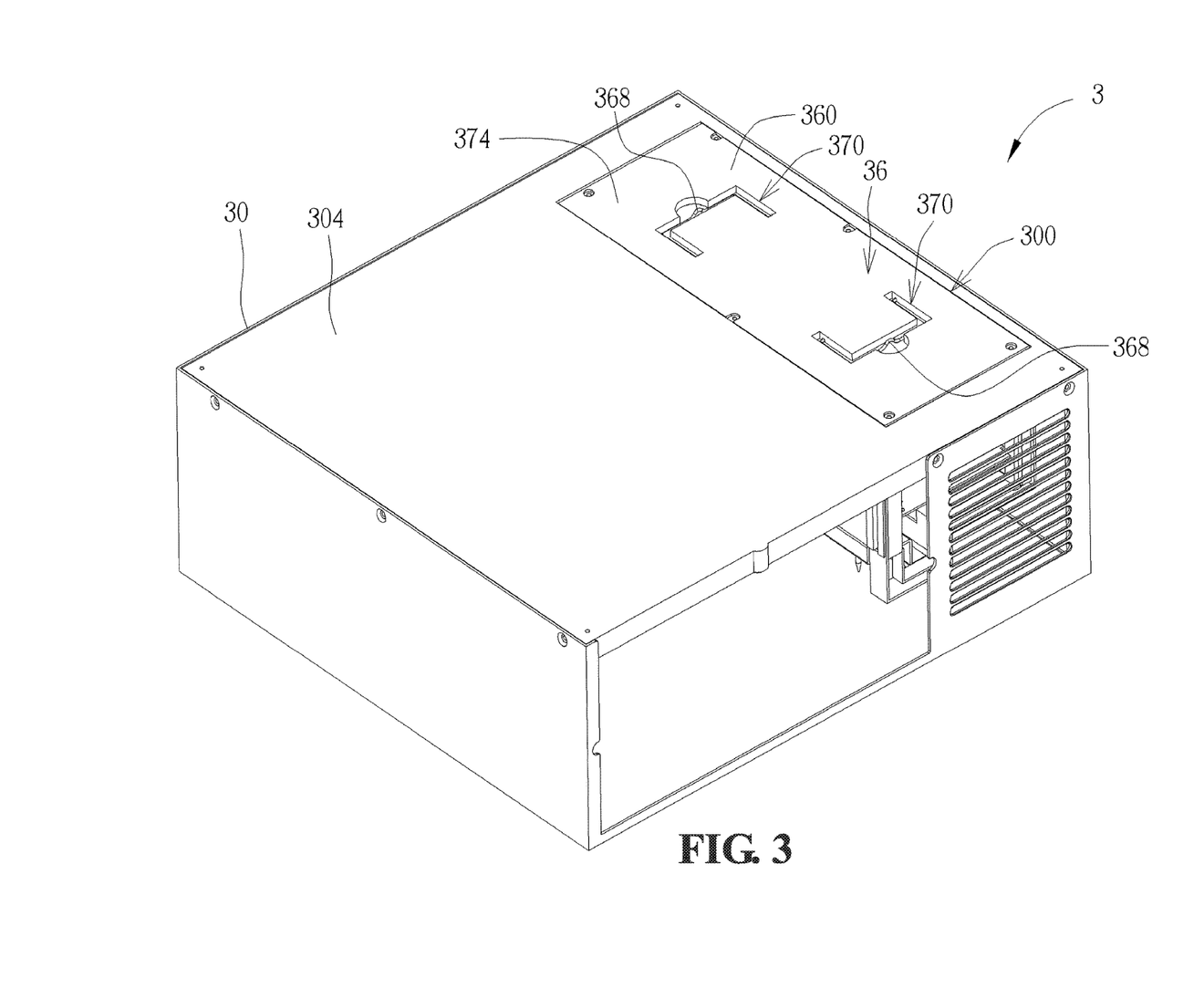
FIG. 3 is a three dimensional view of the back side of the projector of FIG. 2.
Figure 4:
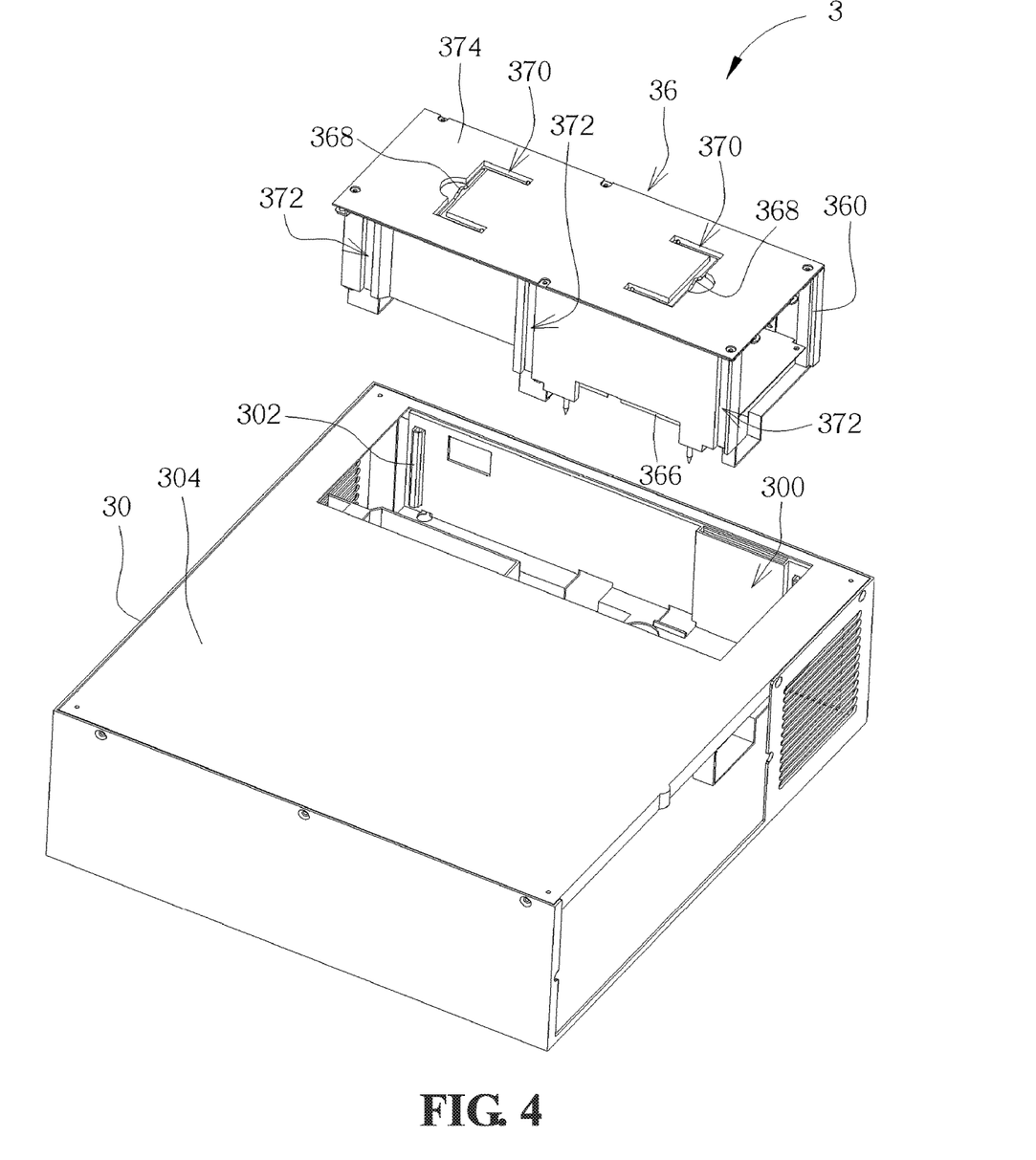
FIG. 4 is an exploded view of the projector of FIG. 2.
Figure 5:
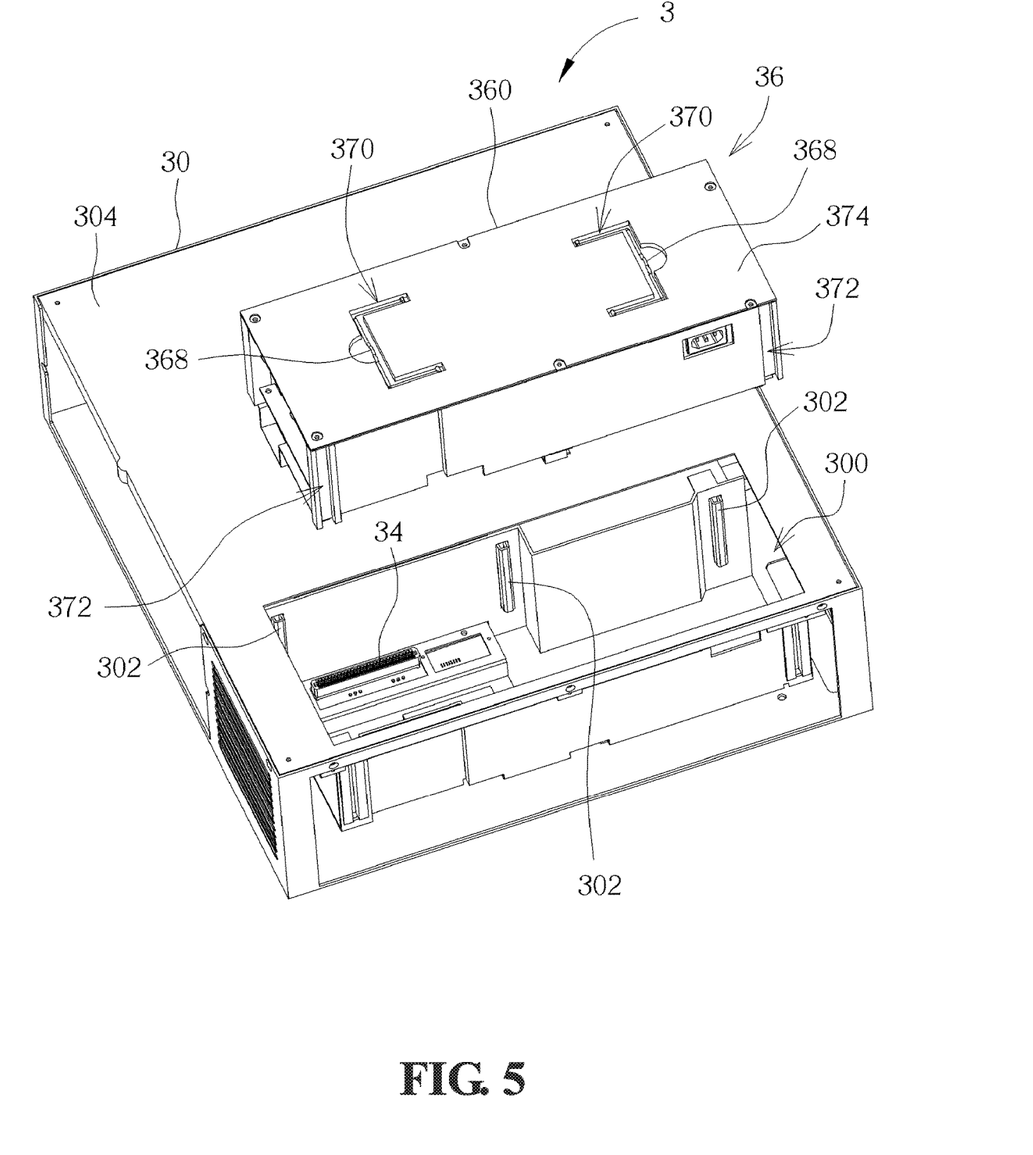
FIG. 5 is an exploded view of the projector of FIG. 2 from another viewing angle.
Figure 6:
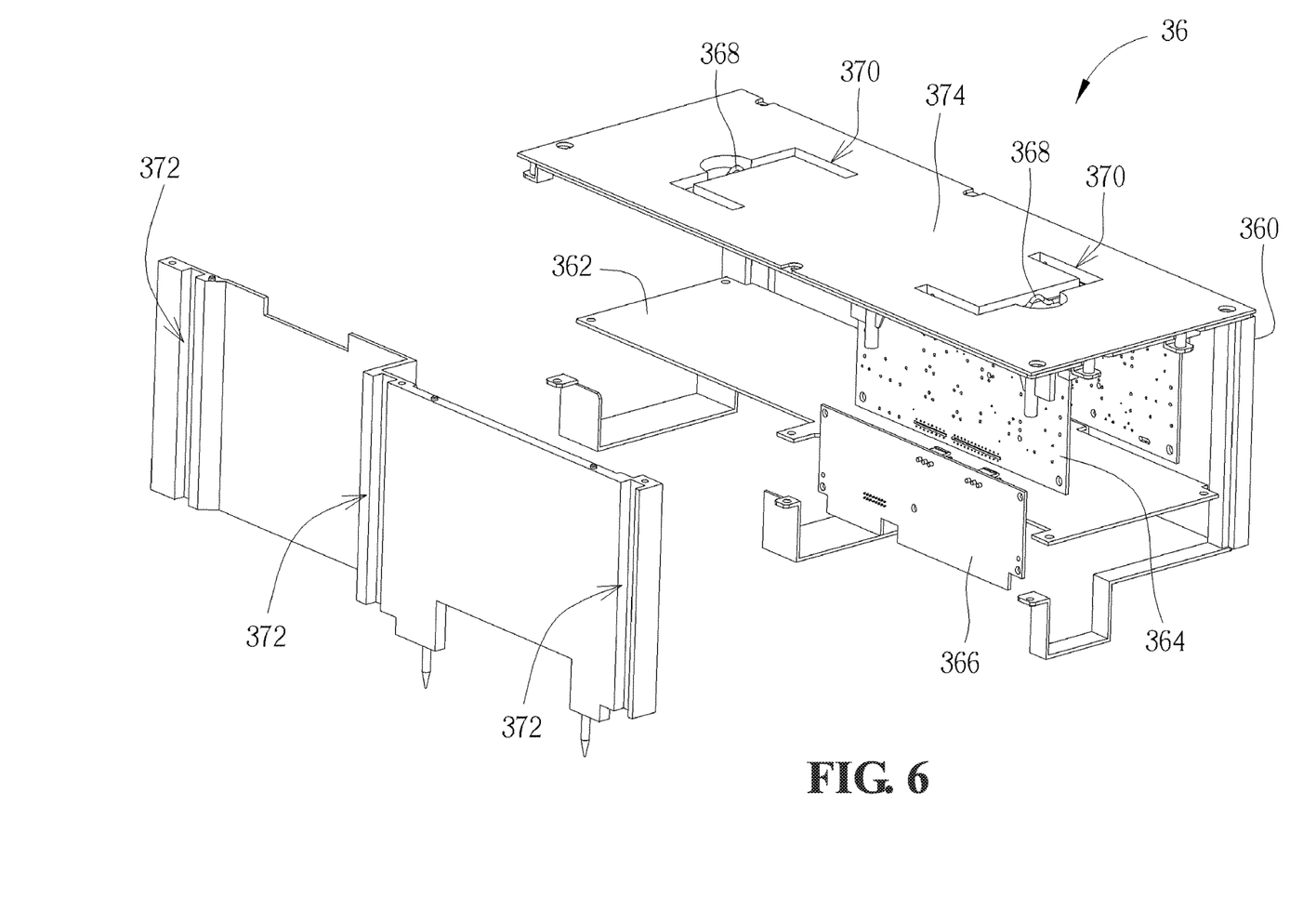
FIG. 6 is an explosion view of the power board and ballast module of FIG. 4.
Figure 7:
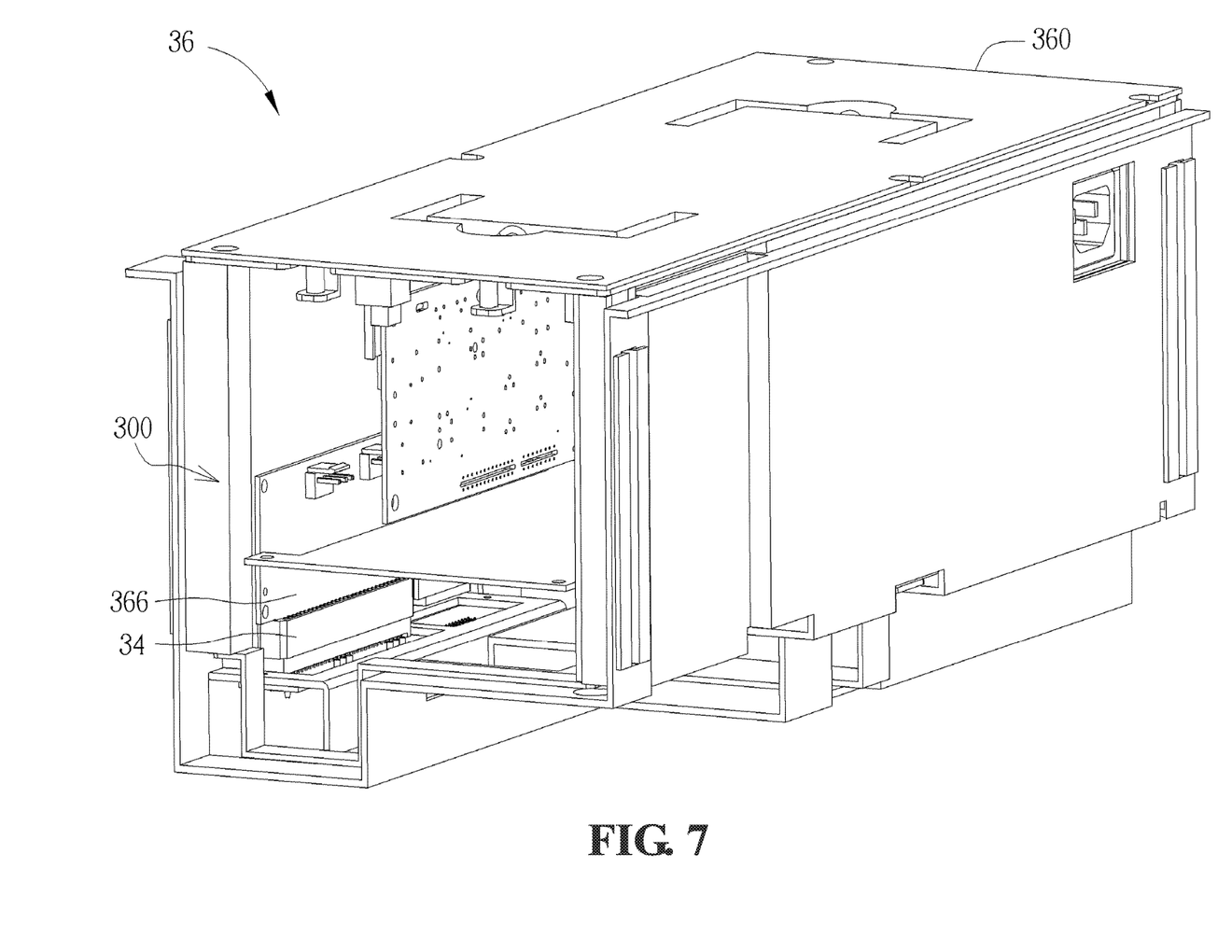
FIG. 7 is a three dimensional view of the first electrical connector electrically connecting to the second electrical connector.
Figure 8:
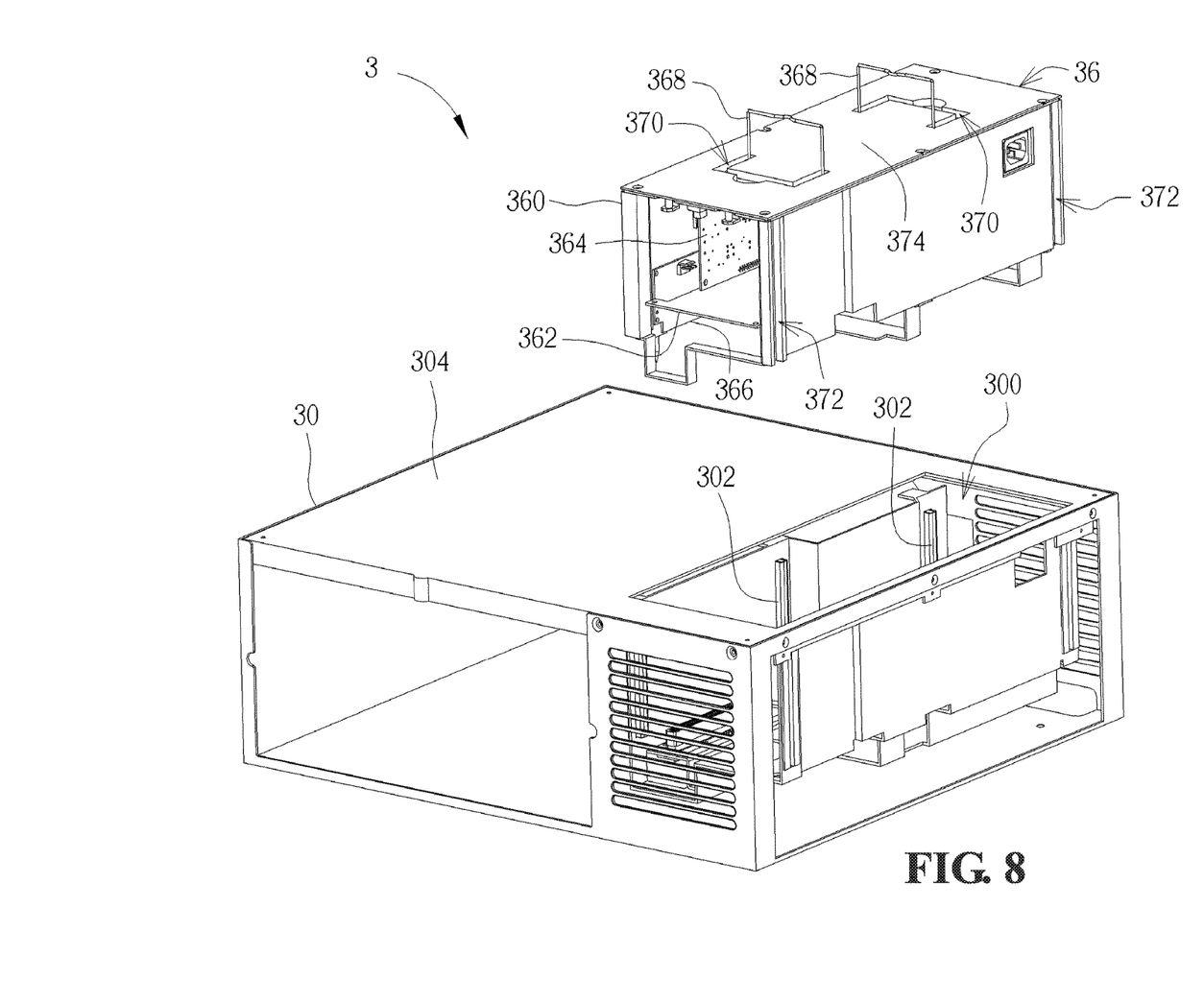
FIG. 8 is a three dimensional view of the handheld part in an unfolded position relative to the housing.

Please refer to FIG. 2 through FIG. 8. FIG. 2 is a three dimensional view of a projector 3 according to an embodiment of the present invention. FIG. 3 is a three dimensional view of the back side of the projector 3 of FIG. 2. FIG. 4 is an exploded view of the projector 3 of FIG. 2. FIG. 5 is an exploded view of the projector 3 of FIG. 2 from another viewing angle. FIG. 6 is an exploded view of the power board and ballast module 36 of FIG. 4. FIG. 7 is a three dimensional view of the first electrical connector 34 and the second electrical connector 366 being electrically connected to each other. FIG. 8 is a three dimensional view of the handheld part 368 in an unfolded position relative to the housing 360.

As shown in FIG. 2 through FIG. 6, the projector 3 includes a casing 30, an opto-mechanical module 32, a first electrical connector 34, a power board and ballast module 36 and a lens 38. The back side of the casing 30 includes a containing tank 300 as shown in FIG. 4. The opto-mechanical module 32 is disposed in the casing 30. Part of the lens 38 is also disposed in the casing. The lens 38 and the opto-mechanical module 32 work together to project an image. The first electrical connector 34 is disposed in the containing tank 300 as shown in FIG. 5. The opto-mechanical module 32 is electrically connected to the first electrical connector 34.

The power board and ballast module 36 includes a housing 360, a power board 362, a ballast 364, a second electrical connector 366 and two handheld parts 368. The housing 360 is detachably disposed in the containing tank 300 of the casing 30. The power board 362 is disposed in the housing 360. The ballast 364 is disposed in the housing 360 and electrically connected to the power board 362. The second electrical connector 366 is disposed in the housing 360 and exposed out of the housing 360. The power board 362 and the ballast 364 are electrically connected to the second electrical connector 366, respectively. Please note that the quantities of the power board 362 and the ballast 364 are determined and disposed based on practical demands, and are not limited to one for each of the components. The handheld part 368 is disposed on the housing 360. In the embodiment, the handheld part 368 is pivotally connected to the housing 60 so that the handheld part 368 can rotate between an unfolded position as shown in FIG. 8 and a folded position as shown in FIG. 3 relative to the housing 360. The housing 360 may also include two fillisters 370 for containing the handheld part 368. Please note that the quantities of the handheld part 368 and the fillister 370 are determined and disposed based on practical demands, and are not limited to two for each of the components. Alternatively, according to an embodiment of the present invention, one or more openings can be formed on the housing 360 to act as the handheld part for accommodating the user's fingers. Thus, the handheld part 368 is not limited to what is shown in the figures.

As shown in FIGS. 4 and 5, the inner side of the containing tank 300 of the casing 30 includes a plurality of slide rails 302, the outer side of the housing 360 of the power board and ballast module 36 includes a plurality of slide slot 372, and the slide slots 372 are disposed corresponding to the slide rails 302. Please note that according to another embodiment of the present invention, the slide slots 372 can be disposed on the inner side of the containing tank 300 of the casing 30, and the slide rails 302 can be disposed on the outer side of the housing 360 of the power board and ballast module 36 upon practical demands. In other words, as long as the inner side of the containing tank 300 of the casing 30 includes one of the slide slots 372 and the slide rails 302, and the outer side of the housing 360 of the power board and ballast module 36 includes the other of the slide slots 372 and the slide rails 302, the housing 360 would become detachably disposed in the casing 30. Moreover, the quantities of the slide slot 372 and the slide rail 302 are determined and disposed based on practical demands, and are not limited to one for each of the components.

When the user desires to dispose the power board and ballast module 36 into the containing tank 300 of the casing 30, the slide slots 372 and the slide rails 302 are used to position the power board and ballast module 36 and the containing tank 300. The user may simply push the housing 360 of the power board and ballast module 36 into the containing tank 300 of the casing 30 to the end, and assembly of the power board and ballast module 36 into the casing 30 is completed. When the housing 360 of the power board and ballast module 36 is disposed in the containing tank 300 of the casing 30, the first electrical connector 34 in the housing 360 and the second electrical connector 366 of the power board and ballast module 36 are electrically connected to each other as shown in FIG. 7. Then the projector 3 can operate normally.

In the embodiment of the present invention, the first electrical connector 34 and the second electrical connector 366 can be implemented by a female connector and a corresponding male connector. When the user pushes the housing 360 of the power board and ballast module 36 into the containing tank 300 of the casing 30 to the end, the male connector is plugged into the female connector so that the first electrical connector 34 and the second electrical connector 366 are electrically connected to each other. Please note that in another embodiment of the present invention, the first electrical connector 34 and the second electrical connector 366 can be implemented by other types of connectors, and are not limited to the embodiment described above.

As shown in FIG. 3, when the housing 360 of the power board and ballast module 36 is disposed in the containing tank 300 of the casing 30, the outer side 374 of the housing 36 and the outer side 304 of the casing 30 are substantially coplanarized. Thus, when the housing 360 of the power board and ballast module 36 is disposed in the containing tank 300 of the casing 30, exterior of the casing 30 is smooth and nice looking.

When the power board 362 and/or the ballast 364 are/is damaged, the user may rotate the handheld part 368 to the unfolded position relative to the housing 36 as shown in FIG. 8. The user then can easily disassemble the power board and ballast module 36 from the containing tank 300 of the casing 30 by lifting the handheld part 368, so as to replace the power board 362 and/or the ballast 364 quickly. After replacement, the user may simply dispose the power board and ballast module 36 into the containing tank 300 of the casing 30 to allow the second electrical connector 366 of the power board and ballast module 36 to electrically connect to and the first electrical connector 34 in the housing 360, so that the projector 3 can operate normally right away. Therefore, the present invention improves the assembly and disassembly efficiency of the power board 362 and/or the ballast 364.

Please note that in addition to the power board 362 and the ballast 364 being modulated into the power board and ballast module 36, other electronic components in the projector 3 can also be selectively modulated into an electronic module so as to improve the assembly and disassembly efficiency.

Figure 9:
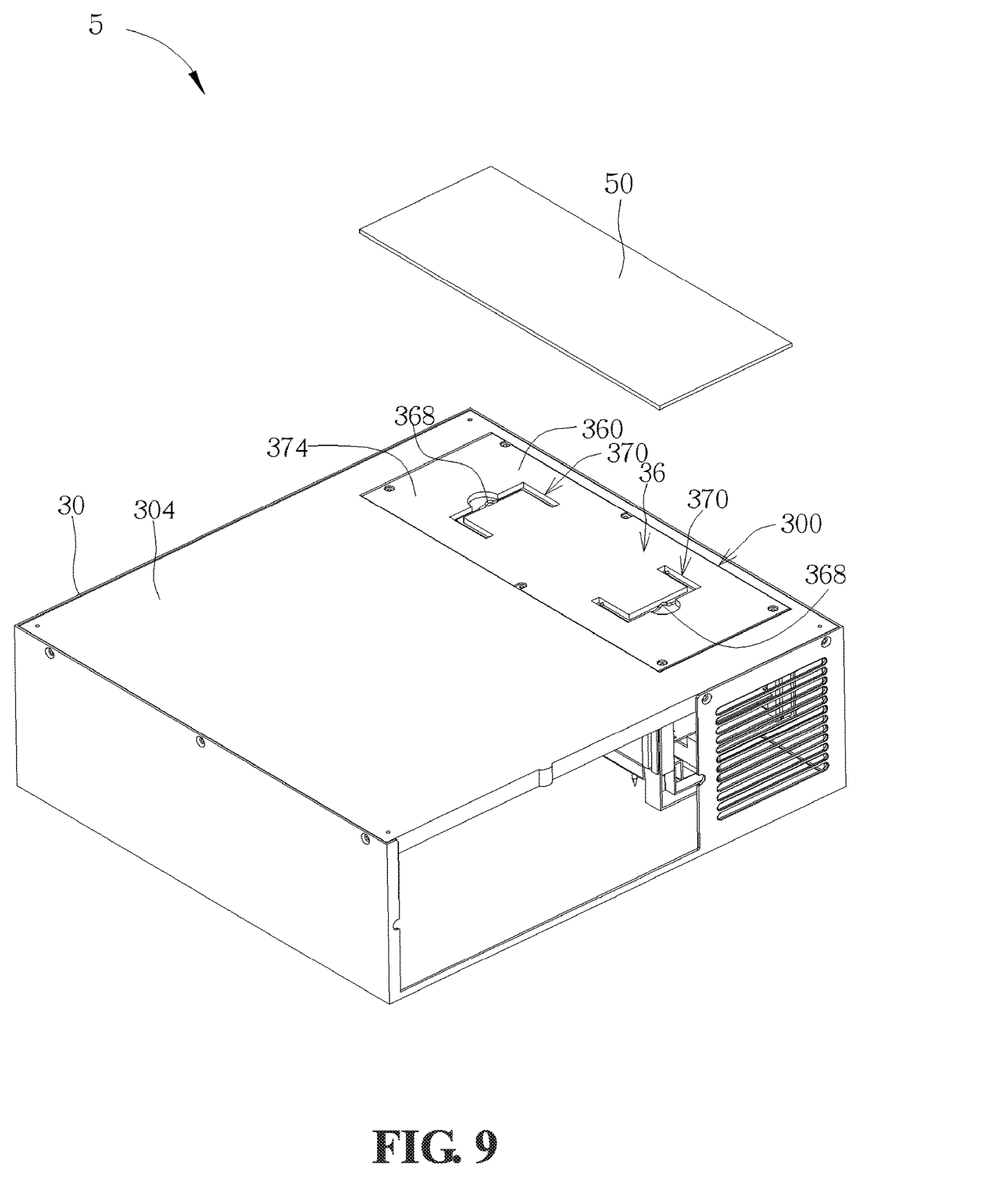
FIG. 9 is a three dimensional view of a projector according to another embodiment of the present invention.

Please refer to FIG. 9. FIG. 9 is a three dimensional view of a projector 5 according to another embodiment of the present invention. The projector 5 differs from the projector 3 in that the projector 5 further includes a cover 50 for covering the power board and ballast module 36 and the containing tank 300.

In sum, according the present invention the power board and the ballast of the projector are modulated into the power board and ballast module, and a containing tank is formed on the casing of the projector to contain the power board and ballast module. When the power board and/or the ballast are/is damaged, the user is able to easily disassemble the power board and ballast module from the containing tank so that the damaged power board and/or the ballast can be replaced quickly. After replacement, the user may simply dispose the power board and ballast module in the containing tank to allow the electrical connector of the power board and ballast module to electrically connect to the electrical connector in the containing tank, and the projector would operate normally right away. Thus the present invention improves the assembly and disassembly efficiency of the power board and/or the ballast. Please note that in addition to the power board and the ballast being modulated into the power board and ballast module, other electronic components can also be selectively modulated into an electronic module so as to improve the assembly and disassembly efficiency.

Those skilled in the art will readily observe that numerous modifications and alterations of the device and method may be made while retaining the teachings of the invention.

What is claimed is:

1. A projector comprising:
   a casing comprising a containing tank;
   an opto-mechanical module disposed in the casing;
   a first electrical connector disposed in the containing tank, the opto-mechanical module being electrically connected to the first electrical connector; and
   a power board and ballast module, comprising:
      a housing detachably disposed in the containing tank;
      a power board disposed in the housing;
      a ballast disposed in the housing and electrically connected to the power board; and
      a second electrical connector disposed in the housing and exposed out of the housing, the power board and the ballast being electrically connected to the second electrical connector respectively, wherein when the housing is disposed in the containing tank, the first electrical connector is electrically connected to the second electrical connector.

2. The projector of claim 1, wherein the power board and ballast module further comprises a handheld part disposed on the housing.

3. The projector of claim 2 wherein the handheld part is pivotally connected to the housing.

4. The projector of claim 2, wherein the housing comprises a fillister for containing the handheld part.

5. The projector of claim 1, wherein an inner side of the containing tank comprises a first slide slot or a first slide rail, an outer side of the housing comprises a second slide rail corresponding to the first slide slot or a second slide slot corresponding to the first slide rail.

6. The projector of claim 1, wherein when the housing is disposed in the containing tank, an outer side of the housing and an outer side of the casing are substantially coplanarized.

7. The projector of claim 1, further comprising a cover for covering the containing tank.

8. A projector comprising:
   a casing comprising a containing tank;
   an opto-mechanical module disposed in the casing;
   a first electrical connector disposed in the containing tank, the opto-mechanical module being electrically connected to the first electrical connector; and
   an electronic module comprising:
      a housing detachably disposed in the containing tank;
      a plurality of electronic components disposed in the housing; and
      a second electrical connector disposed in the housing and exposed out of the housing, the plurality of electronic components being electrically connected to the second electrical connector individually, wherein when the housing is disposed in the containing tank, the first electrical connector is electrically connected to the second electrical connector.

9. The projector of claim 8, wherein the electronic module further comprises a handheld part disposed on the housing.

10. The projector of claim 9, wherein the handheld part is pivotally connected to the housing.

11. The projector of claim 9, wherein the housing comprises a fillister for containing the handheld part.

12. The projector of claim 8, wherein an inner side of the containing tank comprises a first slide slot or a first slide rail, an outer side of the housing comprises a second slide rail corresponding to the first slide slot or a second slide slot corresponding to the first slide rail.

13. The projector of claim 8, wherein when the housing is disposed in the containing tank, an outer side of the housing and an outer side of the casing are substantially coplanarized.

14. The projector of claim 8, further comprising a cover for covering the containing tank.

15. The projector of claim 8, wherein the plurality of electronic components comprise a power board and a ballast.

* * * * *